(12) United States Patent
Schimert et al.

(10) Patent No.: US 8,600,917 B1
(45) Date of Patent: Dec. 3, 2013

(54) COUPLING TIME EVOLUTION MODEL WITH EMPIRICAL REGRESSION MODEL TO ESTIMATE MECHANICAL WEAR

(75) Inventors: James Schimert, Seabeck, WA (US); Arthur Ray Wineland, Long Beach, CA (US)

(73) Assignee: The Boeing Company, Chicago, IL (US)

( * ) Notice: Subject to any disclaimer, the term of this patent is extended or adjusted under 35 U.S.C. 154(b) by 301 days.

(21) Appl. No.: 13/088,683

(22) Filed: Apr. 18, 2011

(51) Int. Cl.
G06N 5/00 (2006.01)

(52) U.S. Cl.
USPC .............................................. 706/14; 706/45

(58) Field of Classification Search
USPC ...................................................... 706/14, 45
See application file for complete search history.

(56) References Cited

U.S. PATENT DOCUMENTS

| | | | |
|---|---|---|---|
| 5,050,081 | A | 9/1991 | Abbott et al. |
| 6,799,154 | B1 | 9/2004 | Aragones et al. |
| 6,832,205 | B1 | 12/2004 | Aragones et al. |
| 7,062,370 | B2 | 6/2006 | Vhora et al. |
| 7,286,923 | B2 | 10/2007 | Pomeroy et al. |
| 7,383,165 | B2 | 6/2008 | Aragones |
| 7,403,877 | B2 | 7/2008 | Aragones et al. |
| 7,428,478 | B2 | 9/2008 | Aragones |
| 7,457,732 | B2 | 11/2008 | Aragones et al. |
| 7,577,549 | B2 | 8/2009 | Osborn et al. |
| 2009/0048730 | A1 | 2/2009 | Akkaram et al. |
| 2010/0082267 | A1 | 4/2010 | Schimert et al. |
| 2011/0173496 | A1* | 7/2011 | Hosek et al. ................. 714/26 |

OTHER PUBLICATIONS

Schwabacher, "A Survey of Data-Driven Prognostics," Proc. AIAA Infotech@Aerospace Conf., Sep. 26-29, 2005, Arlington, Virginia (AIAA 2005-7002).

Schwabacher et al., "A Survey of Artificial Intelligence for Prognostics," Proc. AIAA Fall Symp.: AI for Prognostics, Nov. 9-11, 2007, Arlington, Virginia.

Huang et al., "Residual life predictions for ball bearings based on self-organizing map and back propagation neural network methods," Mechanical Systems and Signal Processing, vol. 21 (2007), pp. 193-207.

Schimert et al., "Coupling a Dynamic Linear Model with Random Forest Regression to Estimate Engine Wear." Annual Conf. Prognostics and Health Management Society, 2010.

West, "Bayesian Model Monitoring," J. Royal Statistical Society. Series B (Methodological), vol. 48, No. 1 (1986), pp. 70-78.

(Continued)

*Primary Examiner* — Wilbert L Starks
(74) *Attorney, Agent, or Firm* — Ostrager Chong Flaherty & Broitman P.C.

(57) ABSTRACT

Mechanical systems wear or change over time. Data collected over a system's life can be input to statistical learning models to predict this wear/change. Previous work by the inventors trained a flexible empirical regression model at a fixed point of wear, and then applied it independently at time points over the life of an engine to predict wear. The embodiment disclosed herein relates those wear predictions over time using a time evolution model. The time evolution model is sequentially updated with new data, and effectively tunes the empirical model for each engine. The combined model predicts wear with dramatically reduced variability. The benefit of reduced variability is that engine wear is more evident, and it is possible to detect operational anomalies more quickly. In addition to tracking wear, the model is also used as the basis for a Bayesian approach to monitor for sudden changes and reject outliers, and adapt the model after these events.

20 Claims, 5 Drawing Sheets

(56) References Cited

OTHER PUBLICATIONS

West et al., "Monitoring and Adaptation in Bayesian Forecasting Models," J. Am. Statistical Assoc., vol. 81, No. 395 (1986), pp. 741-750.

Basu et al., "Regression Based Method for Predicting Engine Wear from Exhaust Gas Temperature," Annual Conf. Prognostics and Health Management Society, 2008.

Liaw et al., "Classification and Regression by randomForest," R News, vol. 2/3, Dec. 2002, pp. 18-22.

* cited by examiner

COUPLING TIME EVOLUTION MODEL WITH EMPIRICAL REGRESSION MODEL TO ESTIMATE MECHANICAL WEAR

BACKGROUND

This disclosure relates to a data-driven method and system for estimating and tracking accurate operational states of mechanical systems. In particular, the disclosure relates to a data-driven method and system for estimating and tracking operational states, such as wear or anomalies over time, of mechanical systems.

Mechanical systems, such as engines, turbines, tires, brakes, and other system components, found in aircraft, automobiles, trucks, watercraft, power generator units, military vehicles, and other vehicles, wear or change over time. Wear affects the performance of such mechanical systems. A key factor in monitoring the health of a mechanical system is to measure system wear as it occurs over time. Such monitoring can aid in maintenance planning and timely repair or replacement of the mechanical system or components thereof. For example, with gas turbine engines, to get the same thrust output as an engine wears, the engine requires more fuel, and the engine's exhaust gas temperature (EGT), as it leaves the engine, increases. However, EGT is also affected by outside variables, such as environmental influences (e.g., temperature and air quality), flight conditions, system faults, and other engine parameters for any given flight or data point. Such factors may overwhelm the EGT value more than wear for a given data point. Typically, engine wear is not evident in a time series plot of raw EGT data plotted over the lifetime of an engine. Thus, EGT by itself may not reveal engine wear that is hidden by the variability due to environmental, operational and other factors.

Known methods and systems exist for monitoring and estimating the wear of a mechanical system. Empirical methods and systems for estimating wear typically manually manipulate recorded data into tables for lookup. Such manual empirical methods are limited in the amount of data that can be assembled and are not in an automated format to create a prediction model. In addition, such manual methods may be imprecise because of the outside influences discussed above. Other known methods and systems use theoretical models of the mechanical system which use physics or engineering information to build a model using test data. Such modeling is based on understanding how a system operates and progresses to a failure via knowledge, for example, of material properties and response to loading. However, such physics or engineering model-based methods may use simplifying assumptions and are theoretical in nature. Moreover, such methods and systems only collect data when the engine is new and do not continually collect data during flights or track degradation of a system over time. Outside influences, as in the empirical method, may not be accounted for.

With regard to known methods and systems that estimate mechanical system wear over time, the resulting output might be plotted over time to observe trends. The scatter of the individual points is large enough that large rolling averages are required to obtain a value that can be used with confidence. This can cause time delays for any corrective action that may be needed and also for prediction of scheduled maintenance for the engine.

Data collected over a system's life can be input to statistical learning models to estimate and track wear/change in a mechanical system. U.S. Patent Application Publ. No. 2010/0082267 (incorporated by reference herein) discloses an automated data-driven method for estimating one or more operational states, such as wear or degradation, of a mechanical system over time. The method comprises training a regression model at a fixed point of wear, and then applying it independently at time points over the life of the system to estimate wear. More specifically, the method comprises the steps of collecting data on the mechanical system from a data recording device, preprocessing the collected data, selecting a training data set that represents a base condition for statistical comparison, fitting a statistical model to the training data set to relate a system output to variables at the base condition, and using an output model to predict what an observed response would have been at the base condition and calculating the difference between the observed response and the predicted response to estimate the one or more operational states of the mechanical system. In particular, U.S. Patent Application Publ. No. 2010/0082267 discloses a procedure that empirically relates mechanical system output (e.g., engine EGT) to other factors (e.g., environmental, flight and mechanical parameters). The residuals are the difference between the observed mechanical system output (e.g., engine EGT) and the output predicted by the model, and represent mechanical system wear over time or operational anomaly (part failure).

As a baseline for comparison, an aircraft owner is typically provided normalized EGT data schedules by the engine manufacturer (for brevity, "OEM"). A previous investigation described by Basu et al. [see "Statistical Methods for Modeling and Predicting Maximum Engine Exhaust Gas Temperature (EGT): First Analysis Using Climb Data from a Single Aircraft", Networked Systems Technology Technical Report (NST-08-001) (2008) and "Regression Based Method for Predicting Engine Wear from Exhaust Gas Temperature", Prognostics and Health Management Conference, Denver, Colo. (2008)] showed that a data-driven approach outperformed the OEM results in the sense that its predictions (using a random forest) had a similar range for estimating engine wear, but about 25% smaller variation.

There is a need for a data-driven method and system that further reduces variability in estimation for operational states such as wear, and also monitors for more abrupt changes in the condition of mechanical systems.

SUMMARY

Data collected over a system's life can be input to statistical learning models to focus data model results for estimating wear/change of mechanical systems. The wear of a mechanical system can be accurately tracked using (1) data collected during use and (2) data-driven statistical models. In the particular example of a gas turbine aircraft engine, exhaust gas temperature (EGT) can be modeled as a function of other recorded parameters. However, application of the techniques disclosed herein is not limited to gas turbines. These techniques could also be used for other systems that slowly change (degrade) over time.

The embodiment disclosed in detail hereinafter adopts a data-driven approach to reduce the variability of normalized EGT by accounting for both (1) the effect of other variables and (2) time dependence. The approach builds a data-driven model using volumes of flight data that are increasingly collected routinely on modern aircraft. Such a data-driven approach contrasts with a physics model approach developed using physics/engineering insight and test data.

In the previous work by Basu et al. mentioned above, a flexible empirical regression model was trained at a fixed point of wear, and then applied independently at time points over the life of an engine to estimate wear. However, wear typically occurs slowly and smoothly. In accordance with the embodiment disclosed herein, a dynamic linear model (which is an example of a state space method) is coupled with the empirical regression model to provide the benefit of relating wear estimations over time. The combined model estimates operational states, such as wear or anomalies over time, of mechanical systems with reduced variability in the estimations as compared to the empirical regression model alone and a baseline method. The benefit of reduced variability is that mechanical wear is more evident, and it is possible to detect operational anomalies more quickly.

Coupling a time evolution model (e.g., a dynamic linear model) with an empirical regression model (e.g., random forest) reduces variability by accounting for time dependence. The inventors have conducted several experiments that show that using DLMs to relate estimations over time dramatically improves the previously developed data-driven approach described by Basu et al., which itself improves upon the OEM approach.

In addition to tracking wear, the combined model is also used as the basis for a Bayesian approach to monitor for sudden changes and reject outliers, and adapt the model after these events. The monitor can be utilized for fault detection and prognosis.

By accurately tracking wear, the embodiment disclosed herein can quickly observe sharp failures and more quickly spot trend outside of normal behavior. Since the methodology is data driven, and based on empirical models that can be applied to many subsystems, it potentially saves costs over a detailed and expensive analysis based on physics/engineering principles that needs to be conducted for each newly encountered subsystem.

Similar normalization problems occur in other contexts. One example is estimating tire pressure loss. The ultimate goal may be to monitor wear or degradation as equipment is used, in order to repair or replace the equipment in a timely manner. The common elements of the approach to such problems disclosed herein are to (1) adjust a quantity of interest for other influences, and (2) relate these adjustments over time.

The above-described subject matter may also be implemented in various other embodiments without departing from the scope of the appended claims. These and various other features will be apparent from a reading of the Detailed Description with reference to the associated drawings.

BRIEF DESCRIPTION OF THE DRAWINGS

Reference will hereinafter be made to the drawings in which similar elements in different drawings bear the same reference numerals.

DETAILED DESCRIPTION

Figure 1:
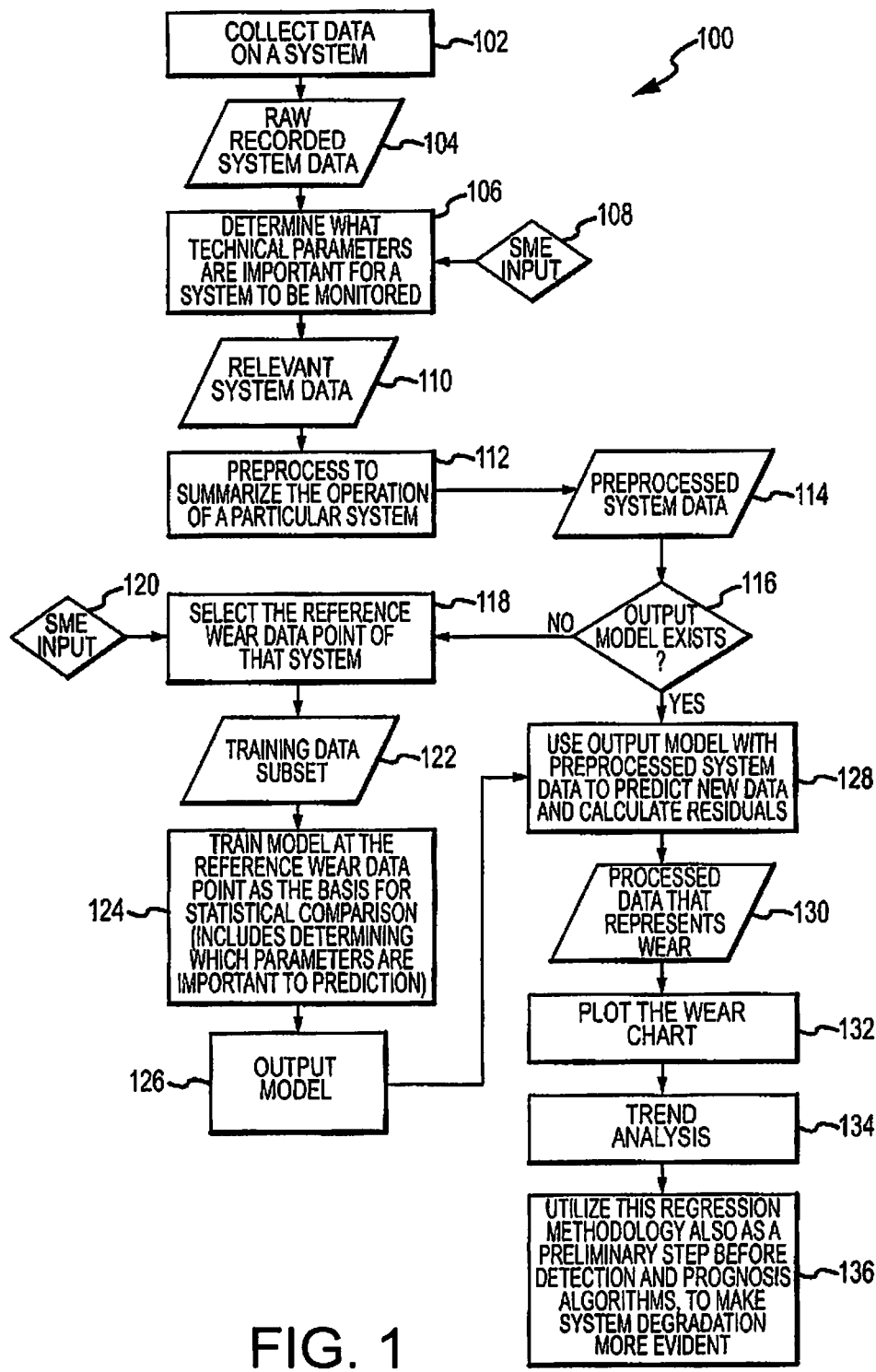
FIG. 1 is a block flow diagram showing one embodiment of the data driven system and method disclosed in U.S. Patent Application Publ. No. 2010/0082267.

The method and system of the disclosed embodiment may be used with any mechanical system that produces data that can be analyzed, such as engines, turbines, oil systems, water cooling systems, or for non-traditional systems that have periodic observations, such as tires and brakes found in aircraft, automobiles and trucks, military vehicles, and other vehicles. Accordingly, one of ordinary skill in the art will recognize and appreciate that the method and system disclosed herein can be used in any number of applications involving the estimating or monitoring of one or more operational states of a mechanical system over time.

One goal of any integrated vehicle health management program for aircraft is to monitor its engine's health, in particular, engine performance. To get the same thrust output as the engine wears, the engine requires more fuel, and so the engine's exhaust gas temperature (EGT) increases. However, environmental, flight, and other engine parameters also affect EGT.

To aid in understanding what follows, some technical background on adaptive nonparametric regression and state space methodology will be briefly discussed. Then the rationale for fitting a regression model to data collected at baseline conditions, producing residuals, and relating these over time using a time evolution model will be explained. Lastly a monitor will be disclosed that employs a Bayes factor (similar to likelihood ratio) to detect outliers, monitor for sudden shifts, and automatically reject outliers and adapt the time evolution model to changes.

TECHNICAL BACKGROUND

Focusing the discussion on regression, a variety of strategies relate a response variable y to a set of covariates x. The classical approach is to postulate a parametric function to predict y at the point x. Harnessing increasingly powerful yet cheap computer resources is one alternative to assuming a parametric model.

Tree-based methods are an example of adaptive nonparametric statistical procedures. Trees can capture non-linear relationships and interactions among predictors. The idea of tree-based regression is to partition covariate space into regions with homogeneous response variables. A recursive partitioning algorithm starts by using a splitting rule to divide the training data into two groups. This procedure is recursively applied to each group until the final groups contain only a few observations. These terminal nodes form a partition of the covariate space which is conveniently represented as a binary tree.

Trees score high in interpretability, but not as high in prediction. To improve prediction, a variety of techniques (e.g., bagging, boosting, random forests) grow an ensemble of trees, each fit to a perturbed version of the training set. These procedures are motivated by the observation that slight changes in the data can lead to different tree structures, but comparable error rates. Fitting trees to deliberately perturbed training data produces a set of plausible models, each achieved by the greedy algorithm converging to different local maxima. Rather than choosing one best model and discarding the rest, the resulting set of plausible models are combined to achieve superior accuracy.

The common method of perturbing data is to bootstrap, i.e., sample with replacement from the original data set. Bagging stands for Bootstrap Aggregation. A tree model is fit to each of several bootstrapped samples. In regression, predictions are obtained by averaging the predictions over the trees. Just as an average has lower variance than a single measurement, bagging reduces variance. This is especially effective when bagging unstable predictors like trees.

As with bagging, random forests use the bootstrap to perturb the data. In addition, they introduce another random element into the tree construction. At each node, a random set of predictor variables is chosen. The best split for the node is found by searching only over this set, and not over all predictor variables. This additional randomness allows variables to occur in the tree model that would not otherwise appear in greedy search approaches, and often helps achieve greater accuracy. The random forests algorithm is disclosed by Breiman, L. (2001), "Random Forests", Machine Learning, Volume 45, Number 1, pages 5-32.

State space models provide a flexible yet relatively simple tool for analyzing dynamic phenomena and evolving systems, and extend classical statistical analysis to non-stationary processes. Informally, a state space model consists of: (1) unobserved state variables whose dynamics are described by a Markov dependency; and (2) observations, which are independent conditional on the state variables. They allow interpreting a time series as the combination of several components, such as trend, seasonality, or regression. State estimation and forecasting are solved by recursively computing the conditional distribution of the quantities of interest, given the available information, and hence can naturally be treated within a Bayesian framework.

The goal of recursive Bayesian estimation is to estimate an unknown probability density function over time using observations and a mathematical process model. A Bayes filter uses information about noise and system dynamics to reduce uncertainty from noisy observations. The recursive algorithm consists of two steps at each time: predict and update, which involve state transition and observation equations. The predict step uses the state estimate from the previous time to produce an a priori state estimate at the current time, which is then updated by combining with current observation information to produce an a posteriori state estimate.

The specific model used in this work is an example of a Dynamic Linear Model (DLM), which is a state space model that is linear and Gaussian. Such modeling is described by West and Harrison in "Bayesian Forecasting and Dynamic Models," Springer (1999) and by Pole et al. in "Applied Bayesian Forecasting and Time Series Analysis," Chapman & Hall (1994) (hereinafter "Pole et al. (1994)"). Dynamic Linear Models offer a flexible framework to model both smooth and abrupt changes in time series, and accommodate subjective information. In its simplest form, a DLM is estimated using a Kalman filter, although Markov Chain Monte Carlo (MCMC) and particle filtering are used for more complex versions, as disclosed by Petris et al. in "Dynamic Linear Models with R", Springer (2009) (hereinafter "Petris et al. (2009)").

The observation equation of a DLM is a multivariate regression that relates the observation to trend, regressors, seasonality and other components. A system equation describes the evolution of the regression coefficients (state parameters) through time.

Prior Data-Driven Approach

U.S. Patent Application Publ. No. 2010/0082267 discloses a method for training a flexible empirical regression model at a fixed point of wear, and then applying it independently at time points over the life of an engine to estimate wear. The method estimates wear as the residuals that result from using statistical regression.

The method in accordance with one embodiment comprises the step of collecting data on the mechanical system via a data collection component, such as from a data recording device. The data collected may include numerous technical parameters specific to a particular mechanical system, as well as various environmental and operational data. For example, the data collected for an aircraft engine may include, but is not limited to, such data as exhaust gas temperature (EGT), Mach number, engine spool speeds, pressure altitude, total air temperature, calibrated air speed, oil pressure, oil quantity, sensor information, fuel flow actual and commanded, engine pressure ratio actual and commanded, flight mode, throttle lever angle, and other suitable data. In addition, the data recording device for collecting data for an aircraft engine may be a Quick Access Recorder (QAR) on an aircraft. Such data may be recorded and collected from a single aircraft or multiple aircraft over the lifetime of the mechanical system. The data may be recorded and collected during initial climb of the aircraft over many flights, during descent of the aircraft over many flights, during cruise of the aircraft over many flights, or during other operational modes of the aircraft. The collecting data step may further comprise the step of determining one or more technical parameters of the mechanical system to be measured relevant to the estimating of the one or more operational states. Such technical parameters may be determined or measured via the use of one or more sensors on the mechanical system.

The method further comprises the step of preprocessing the collected mechanical system data to summarize operation of the mechanical system. The preprocessing step transforms the large amounts of mechanical system data collected into snapshots of data representative of the health of the mechanical system that a user is most interested in. The preprocessing step determines when during the operation of the mechanical system the data is collected, what parameters of the mechanical system are to be monitored or estimated, and how to reduce the amount of data to determine the results. The preprocessing software code may be written in any suitable software programming environment. By example, with aircraft, the data (e.g., propulsion flight data) may be summarized from a single aircraft flight or multiple aircraft flights over the lifetime of the mechanical system. In order to trend aircraft engine EGT over time, the most stable engine operational point possible must be obtained for each flight, ideally at or near the maximum engine operating point. During flight this occurs in two modes: cruise and takeoff. Very stable engine data and aircraft parametric data may be recorded during aircraft cruise. However, the aircraft may not reach cruise during every flight (e.g. during training). Also, during cruise, the engine is not near its maximum operation. During takeoff, the engine is operating near or at its maximum for a fixed period of time, but aircraft parametric and other engine data may be changing. The algorithm of the method finds a window of data in which maximum EGT occurs.

As described above, the method comprises the step of selecting a training data set that represents a base condition for statistical comparison. The training data set is selected using subject matter expert (SME) input. This step creates training data sets during periods of time when the mechanical system output (e.g., engine EGT) is relatively stable, yet there is sufficient variability in other outside factors (e.g., environmental, flight, and mechanical parameters) to represent the variety of conditions under which the mechanical system (e.g., aircraft engine) operates. This step creates appropriate training data sets of the mechanical system's environment (e.g., aircraft flight and engine variables), modeled from any source as long as it is from a consistent wear position for the system. In other words, it is important to ensure that the trained model represents a consistent reference or base point condition in the life of the system. For example, with engines, training data is preferably selected from the middle of the engine's life when engine wear is relatively slow and stable. If there is no low wear state in the life of other systems, such as tire wear, then using data from the time when the system is new is sufficient. If selected correctly, this training data will contain flights that represent a typical set of environmental, flight, and engine parameter conditions that are diverse enough to represent the conditions encountered in future operations. Selecting training data in this way improves results over using data from the entire engine lifetime. However, performance may decrease if the slice of data is too small, leading to insufficient covariate diversity.

The method further comprises the step of fitting a statistical model to the training data set to relate a mechanical system output to variables at the base condition. The statistical model may comprise linear regression, non-linear regression, or adaptive nonparametric procedures such as random forest techniques. A random forest is an example of a tree ensemble which is a nonparametric statistical technique. A nonparametric random forest technique or model may be preferred because it is flexible and is data driven and one does not need to specify what the relationship should be. This step empirically relates the mechanical system output (e.g., engine EGT) or predicted response to outside variables, such as environmental influences (e.g., temperature and air quality), flight conditions, system faults, and mechanical parameters. The modeling software code may be written in any suitable software programming environment. For new environmental (e.g., flight and engine) data, the model predicts the mechanical system output (e.g., EGT) using the trained model.

The method further comprises the step of using an output model to predict what an observed response would have been at the base condition and calculating the difference between the observed response and the predicted response to estimate the one or more operational states of the mechanical system. The predicting component uses the output model to predict the operational states of the mechanical system. The predicting component may be in the form of suitable modeling software. This step generates or calculates the estimated operational states as the residuals, which are the difference between the observed mechanical system output (e.g., EGT) (part of the preprocessed data) and the predicted response. The residuals may represent mechanical system wear over time (e.g., engine performance degradation as noted by mechanical energy needed to produce the same work) or operational anomaly (part failure). The flexible statistical models can be applied to data collected over the mechanical system's life, to account for irrelevant or nuisance factors, and to generate a predictive model of operational states such as wear, degradation or anomalies. Using the model adjusts for environmental and other outside factors and references back to the consistent wear or base point condition. By example, for aircraft engines, the method may use the statistical model to model aircraft gas turbine engine EGT as a function of environmental, flight and engine parameters and to generate the residuals as an estimation of engine wear. The method may further comprise the step of using the estimated one or more operational states for trend analysis.

FIG. 1 is taken from U.S. Patent Application Publ. No. 2010/0082267 and shows an automated data-driven method 100 for estimating wear of a mechanical system over time as described in the preceding paragraphs. The method comprises the step 102 of collecting data on the mechanical system from a data recording device. The result of step 102 is raw recorded mechanical system data 104. The collecting data step may further comprise the step of determining one or more technical parameters of the mechanical system to be measured relevant to the estimating of the one or more operational states. The method shown in FIG. 1 further comprises the step 106 of determining and measuring one or more technical parameters of the mechanical system relevant or important to the estimating of the one or more operational states. SME (subject matter expert) input 108 may be used to input various technical parameters of a particular mechanical system in order to determine and measure such technical parameters. The result of step 106 is relevant mechanical system data 110. Method 100 further comprises the step 112 of preprocessing the collected mechanical system data to summarize operation of the mechanical system, as previously described. The preprocessing software code may be written in Statistical Analysis Software (SAS) or another suitable commercially available software code. The result of step 112 is preprocessed mechanical system data 114.

A determination is then made in step 116 whether a wear model exists. If a wear model exists, then the steps following the arrow labeled "YES" in FIG. 1 are followed. If a wear model does not exist, then the steps following the arrow labeled "NO" in FIG. 1 are followed. In response to a determination that a wear model does not exist, a SME performs the step 118 of selecting a consistent or reference wear data point (base condition) of the mechanical system. This step includes selecting a training data set that represents a base condition for statistical comparison. In order to build a statistical model, it is preferable to have a consistent known starting point. Subject Matter Expert input 120 may be used to select the reference wear data point. The result of step 118 is a training data subset 122.

As shown in FIG. 1, method 100 further comprises the step 124 of fitting a statistical model to the training data set to relate a predicted response to outside variables at the base condition, that is, that the wear data point is a base point for statistical comparison. Such outside variables can include environmental factors (e.g., temperature and air quality), flight information, system faults, and mechanical parameters. This step trains a statistical model at the reference wear data point as the basis for statistical comparison and includes determining which technical parameters are important for estimation or monitoring. The resulting output model 126 is then used with the preprocessed system data in step 128 to predict what an observed response would have been at the base condition and calculating the difference between the observed response and the predicted response to estimate the wear of the mechanical system. As previously discussed, step 128 generates or calculates the estimated operational states or residuals, which is the difference between the observed response or mechanical system output (e.g., EGT) and the predicted response. The result of step 128 is processed data 130 that represents wear.

For new environmental (e.g., flight and engine) data, the model predicts the mechanical system output (e.g., EGT) using the trained model. The residuals may represent mechanical system wear over time (e.g., engine performance degradation as noted by increased mechanical energy needed to produce the same work) or operational anomaly (part failure). The flexible statistical model can be applied to data collected over a mechanical system's life, to account for irrelevant factors and generate a predictive model of operational states such as wear, degradation or anomalies. Using the model adjusts for environmental and other factors and references back to a consistent wear point. By example, for aircraft engines, the method may use the statistical model to model aircraft gas turbine engine exhaust gas temperature (EGT) as a function of environmental, flight and engine parameters and to generate the output data as a predictive model of engine wear.

Still referring to FIG. 1, the method disclosed in U.S. Patent Application Publ. No. 2010/0082267 further comprises the following steps: plotting the estimated operational states or wear chart (step 132), using the plotted operational states or wear for trend analysis (step 134), and using the regression (random forest) methodology or model also, as a preliminary step 136 before detection and prognosis algorithms, to make the mechanical system wear or degradation more evident.

Improved Data-Driven Approach

Figure 2:
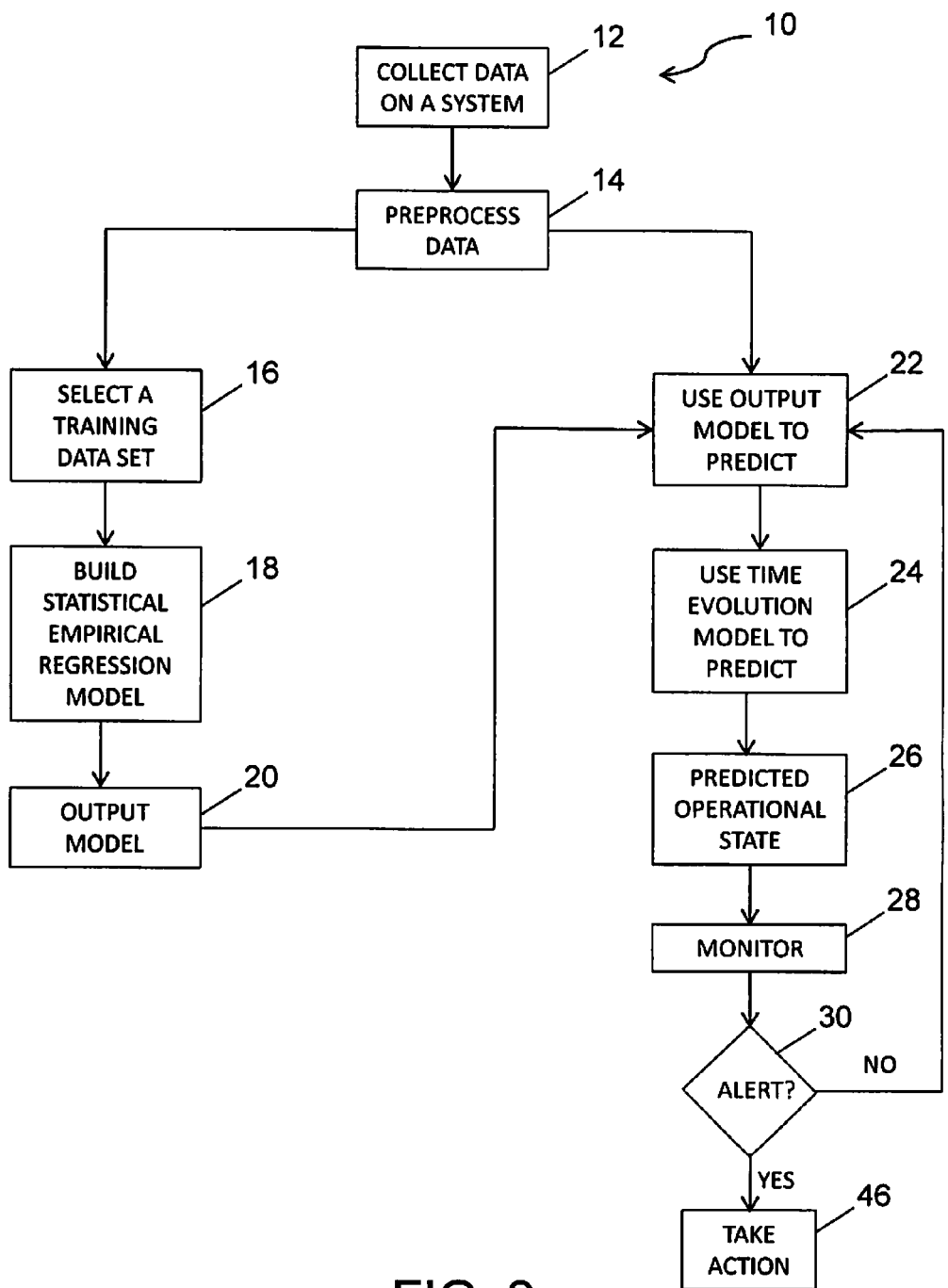
FIGS. 2 and 3 are block flow diagrams showing the methodology combining empirical regression and dynamic linear models in accordance with one embodiment of the invention.

The present invention improves upon the methodology described above. The general outline of this improved methodology is shown in FIG. 2. The method in accordance with one embodiment comprises: collecting data on the aircraft engine via a data collection component (step 12); preprocessing the collected engine data to summarize operation of the engine (step 14); selecting a training data set that represents a base condition for statistical comparison (step 16); fitting a statistical empirical regression model to the training data set to model EGT as a function of other variables (step 18), the result being an output model 20; using the output model to produce residuals that can be interpreted as engine wear plus error (step 22); and using a time evolution model to estimate the operational state (e.g., wear) of the engine (step 24). The estimated operational state 26 of the engine is then monitored (step 28). A determination is then made whether the output of the monitor indicates an alert state (step 30). In response to a monitor output indicating an alert state, an alert signal is issued and appropriate action is taken in step 46. In the absence of a monitor output indicating an alert state, the algorithm returns to step 22.

Data may be collected many times per second over flight. As discussed above, for the purposes of trending EGT over the life of an engine, we found it sufficient to choose a representative data point for each flight. Our approach is to obtain the most stable engine operational point possible, ideally at or near the maximum engine operating point.

Assume that an observed EGT measurement at a time t is a function of other "outside" variables $X_t$ (e.g., environmental, flight, and engine parameters):

$$EGT_t = f(X_t) + W_t + \epsilon_t \quad (1)$$

where $\epsilon_t$ is an error term consisting of measurement error, other variables that have not been measured, and possible model misspecification; and $W_t$ represents wear.

The previous work by Basu et al. estimated the function $\hat{f}(X_t)$ using statistical regression. To estimate the function, the authors experimented with linear, and various nonlinear parametric estimators. What worked the best is a random forest, which is a tree ensemble method, as previously discussed above.

The residuals $r_t$ equal wear plus error:

$$r_t = EGT_t - \hat{f}(X_t) = W_t + \epsilon_t \quad (2)$$

In the previous work by Basu et al., the residuals were used as the estimate of wear. However, the real goal is to estimate the wear $W_t$. Since $W_t$ is unobserved, an improved estimate can be achieved by using a state space approach to estimate a time evolution model that relates the residuals over time. One particular time evolution model is a Dynamic Linear Model (DLM). The DLM is disclosed by West, M. and Harrison, J. (1999). "Bayesian Forecasting and Dynamic Models", Springer.

Wear over the life of a typical engine follows a roughly piecewise linear pattern: a break-in period, followed by a relatively flat section, followed by decreasing slope, possibly accelerating at the end. Therefore, a locally linear growth (or local linear trend, time varying slope) model, also known as a second-order polynomial model, was used to estimate the wear $W_t$.

The DLM that was used is defined by:
Observation Equation: given by Eq. (2).
State Evolution
Local Level:

$$W_t = W_{t-1} + d_{t-1} + \eta_t \quad (3)$$

Local Growth Rate:

$$d_t = d_{t-1} + v_t \quad (4)$$

The error terms $\eta_t$ and $v_t$ are assumed to be normally distributed with mean 0 and covariance $\Sigma$. The wear at time t equals the wear $W_{t-1}$ at the previous time plus a local growth rate $d_{t-1}$. The local growth rate is a random walk. The goal is to estimate the state sequence $W_t$.

One implementation of the foregoing uses several packages from the open source statistical software R: randomForest (Liaw and Wiener (2002)) and dlm packages (see Petris, "dlm: Bayesian and Likelihood Analysis of Dynamic Linear Models. R package version 1.1-1 (2010)). Petris et al. (2009) describe the dlm package.

The methodology used in the previous effort by Basu et al. only requires the current data when predicting and generating residuals using a fitted random forest model. The random forest predicts each observation independently of the past.

In the embodiment of the invention disclosed herein, the DLM relates estimations over time. At each iteration, information about the past is encoded and saved as the parameters of the DLM from the previous iteration. These parameters need to be stored for each aircraft/engine. If DLM estimates from the previous iteration do not already exist, then the program gets default starting values, which represent an aggregate model estimated from historical engine data.

In one embodiment, default starting values may be generated by fitting a DLM model to the random forest residuals for each engine in the training data. The default starting value for the observation variance is the median. For the state estimates, the first 15 random forest residuals of each engine data series are used to estimate a linear regression. The intercept and slope represent initial estimates for wear and growth for that engine. The default starting value for the local level and growth rate are the medians.

In this way, one set of starting values is used for all engines. Another possibility is to cluster engines, and using separate sets of starting values. Yet another possibility is to use a small set of data at the beginning of engine life to individually estimate a DLM for each engine. This latter approach would mean that at the beginning of engine life, the program returns just the estimation from the random forest, without yet relating them in time.

In one embodiment, the evolution variances (i.e., the diagonal elements of $\Sigma$) are set to large values. This allows the data to "speak for themselves", as is suitable when starting out. The evolution variance is estimated in subsequent iterations using a discount factor $\delta = 0.9$ (see Pole et al. (1994)).

Monitor

In experiments, the RF+DLM model above showed improvement over both the OEM solution and the previous solution using just RF residuals. In order to deploy this model in real life solutions, a working implementation should also reject outliers and adapt model parameters after structural changes such as a sudden EGT shift.

The approach used here is based on the work by West (West, M., "Bayesian Model Monitoring", J. Royal Statistical Society, Series B, Vol. 48, pp. 70-78 (1986)) and West and Harrison (West, M. and Harrison, J., "Monitoring and Adaptation in Bayesian Forecasting Models", J. American Statistical Assoc., Vol. 81, No. 395, pp. 741-750 (1986)). This approach is useful and practical in many situations, and has the advantage that discount factors (described below) allow closed form calculations.

Sequential Bayesian modeling analyzes observations in real time, updating inferences and predictive statements using newly obtained information and observations. It assesses model fit using predictive distributions. The idea behind monitoring is to compare the predictive fit of the standard model with an alternative model that specifies the nature of "unusual". The central problem is to construct suitable alternatives to the "standard" model used for analysis. In this work, the alternative model is similar in form to the standard, but allows for changes in the values of the parameters.

Monitoring is based on the Bayes factor, the ratio of likelihoods, which compares the predictive ability of the standard model versus the alternative model. It detects discrepancies between the data and standard model predictions. Examples of model failures include outliers and structural changes in the time series. More formally, the Bayes factor at time t is defined as:

$$H_t = p(y_t|D_{t-1})/p_A(y_t|D_{t-1}) \quad (5)$$

Where a $D_{t-1}$ is the data until time (t−1), and $y_t$ is the current observation. Small values of $H_t$ indicate poor performance of the standard model relative to the alternative model. It is possible to put a threshold on (observation−forecast inconsistency): a Bayes factor>10 gives evidence for the standard model, while >100 gives strong evidence for the standard model; a Bayes factor<1/10 gives evidence for the alternative model, while <1/100 gives strong evidence for the alternative model.

The overall Bayes factor at time t is the product of the Bayes factors until that time, and gives a measure of the global fit. However, the problem with such a global measure is that the greater weight of historical performance may mask local changes. For example, good historical performance of the model may swamp a small Bayes factor due to an outlier, which then goes undetected.

In a practical monitoring application, the local changes are of greatest interest. A cumulative Bayes factor is a product of the most recent k Bayes factors, and is sensitive to local model failure, and can indicate slow changes that may not be evident in a single Bayes factor.

$$W_t(k) = H_t H_{t-1} H_{t-k+1} = H_t W_{t-1}(k-1) \quad (6)$$

To focus on the most likely point of possible change, calculate the most discrepant group of recent, consecutive observations as:

$$V_t = \min_{1 \leq k \leq t} W_t(k) \quad (7)$$

It turns out that when the cumulative evidence at time t favors the standard model, so that $V_{t-1} \geq 1$, then $$V_t = H_t \quad (8)$$

and decisions about possible inadequacies are based on the current observation $y_t$ alone. If the Bayes factor $H_t$ is small enough, then $y_t$ may be an outlier or the beginning of a structural change.

On the other hand, if the evidence before time t is against the standard model, so that $V_{t-1} < 1$, then the cumulative Bayes factor is multiplied by $H_t$:

$$V_t = H_t V_{t-1} \quad (9)$$

In this way, the monitor detects either gradual or abrupt changes.

When changes in parameter values are the primary cause of standard model failure, an additional goal is to automatically adapt to the onset of change. Incorporating increased uncertainties into the model leads naturally to more rapid adaptation by allowing future data to more heavily influence the updating of posterior distributions. In this way, models self correct after structural changes. However, the automatic procedure must also distinguish an outlier from a structural change.

The simple mode of operation of the model monitor using the sequences of cumulative Bayes factors as described above provides an indication of when outliers and changes may have occurred. When a change is signaled with a group of consecutive observations identified as discrepant, action must be taken to adjust the model parameters to adapt to the change. This is achieved in the disclosed embodiment by increasing the uncertainty in the prior distribution as measured by the prior covariance matrix.

The following algorithm (disclosed by West and Harrison, 1986, cited above) uses the monitor to isolate and reject outliers, or in cases of structural change, automatically increase uncertainty about the parameters to allow for rapid adaptation to new data in cases of change.

(A) If $H_t \geq \tau$, then $y_t$ is consistent with the standard model. But the possibility of change before this time t should be assessed by proceeding to (B). If $H_t < \tau$, then $y_t$ may be an outlier that should be rejected, or an indication of change, so proceed to (C).

(B) If the cumulative Bayes factor $V_t \geq \tau$, then proceed to (D) (update as usual). Alternatively, if $V_t < \tau$, then change is indicated; proceed to (C).

(C) Reject $y_t$ as providing no useful information at time t about the standard model parameters. Do not update model using $y_t$ (equivalently, treat $y_t$ as missing). Moreover, allow for change by increasing the uncertainty about the parameter vector, leading to more rapid adaptation to new data. Increase the time index from t to t+1 and return to (A)

(D) Standard update: standard model is satisfactory. Update as usual to the posterior and thence to the prior for time t+1. Return to (A).

Figure 3:
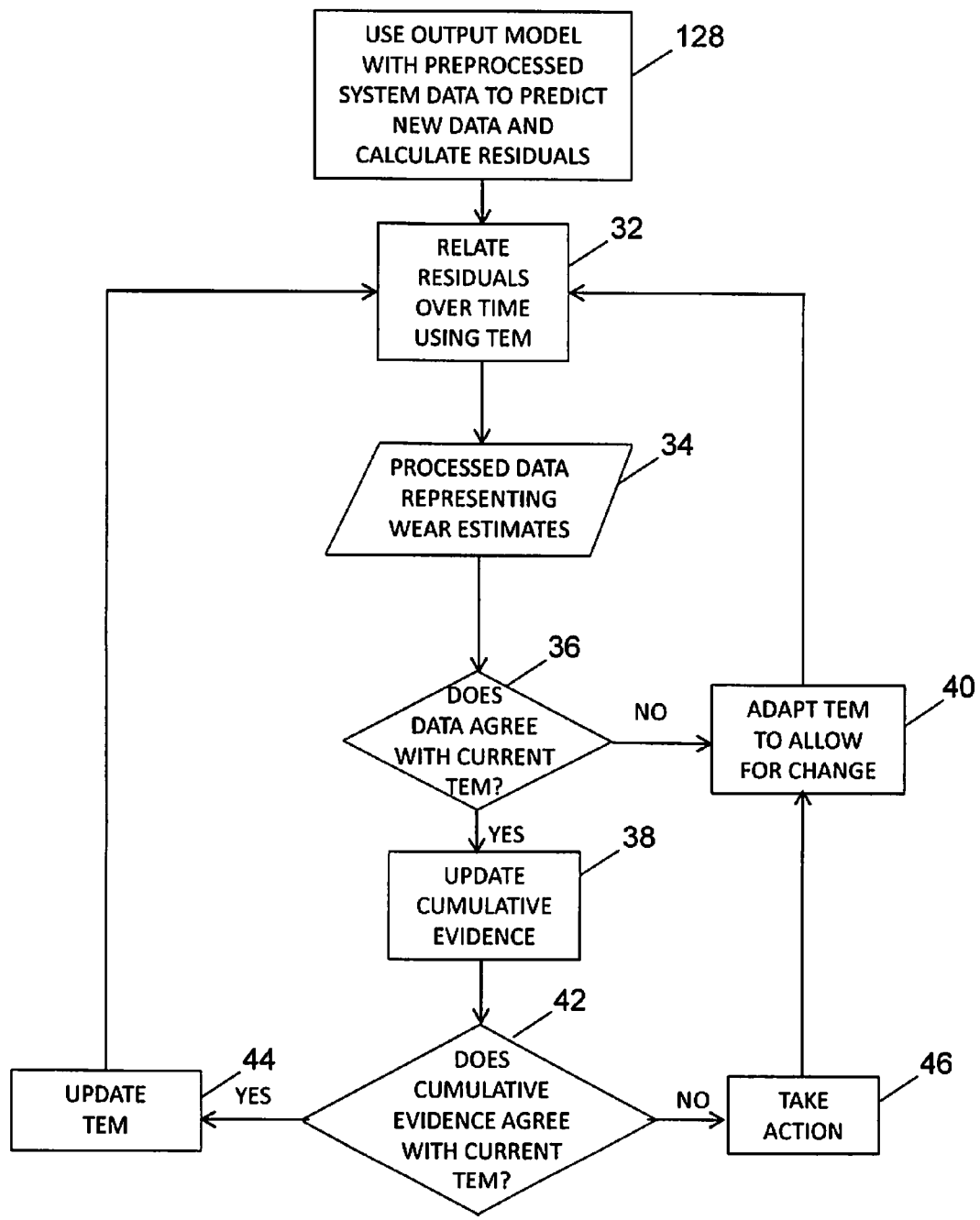

FIG. 3 is a block flow diagram showing the Bayesian model monitoring and automatic adaptation to model change being used in conjunction with the combined (RF+DLM) model. Step 128 is the same as in FIG. 1, namely, the output model is used with preprocessed data to predict new data and calculate residuals. In step 32, those residuals are related over time using the DLM, referred to in FIG. 3 as the TEM (i.e., time evolution model). The resulting processed data 34, representing wear estimates, is then inputted to a monitor, which detects either gradual or abrupt changes. More specifically, the monitor performs steps 36 and 42 described hereinafter.

Still referring to FIG. 3, blocks 36, 38, 40, 42, 44 and 46 in FIG. 3 implement the previously described algorithm for either updating the TEM to reflect gradual change or adapting to the TEM to allow for abrupt change. In step 36, a determination is made whether the data agrees with the current TEM, i.e., whether the Bayes factor equals or exceeds the threshold τ. If NO, then the time evolution model is adapted to allow for abrupt change by increasing the uncertainty of the model (step 40) and the algorithm returns to step 32. If YES, then the cumulative evidence is updated (step 38) and a determination is made in step 42 whether the cumulative evidence agrees with the current time evolution model, i.e., whether the cumulative Bayes factor equals or exceeds the threshold τ. If NO, then the time evolution model is adapted to allow for abrupt change by increasing the uncertainty of the model (step 40) and the algorithm returns to step 32. If YES, then the time evolution model is updated (step 44) before returning to step 32.

To implement the foregoing algorithm, the state evolution covariance matrix must be specified. The values control the stochastic variation in the evolution of the model, and determine the role of past observations. A key problem is that one covariance is typically not suitable for all times. Moreover, it is difficult to specify the covariance elements.

In the system equation, the covariance leads to an increase in uncertainty, or equivalently a loss of information, about the state vector between successive times. This idea is natural, and leads to specifying the posterior covariance as a fraction $1/\delta$ of the prior covariance, and therefore the state evolution covariance as $(1-\delta)/\delta$ of the prior covariance. The degree of adaptation to new data increases as the discount factor becomes smaller.

In one embodiment, the combined (RF+DLM) model uses a discount factor $\delta=0.9$. In the monitor, there are two other uses of the discount factor. First, the alternative model uses a discount factor of 0.05. Second, the monitor enables the combined model to adapt after a structural change by decreasing the discount factor to 0.1.

A preliminary evaluation first looked at the monitor alerts and the detected outliers for the same data set. The monitor generally alerts when the slope changes direction or there is a shift. The authors ran a simple experiment to determine what magnitude shift the monitor can detect, and how long the detection takes. A shift was introduced by incrementing some of the data by 10, and 20 degrees. The threshold $\tau$ on the Bayes factors affects the size of the shift that the algorithm can detect. For $\tau=0.2$, the monitor detected a shift of 20 degrees, but not a 15 degree shift. It took 15 observations to detect the 20 degree shift. But for a threshold $\tau=0.3$, the monitor detected a shift of 15 degrees after 25 observations. Deciding on the appropriate threshold depends on what magnitude shifts the user wants to detect, and also the sensitivity to other changes. Smaller threshold values decrease sensitivity to slower, less marked changes.

Figure 4A:
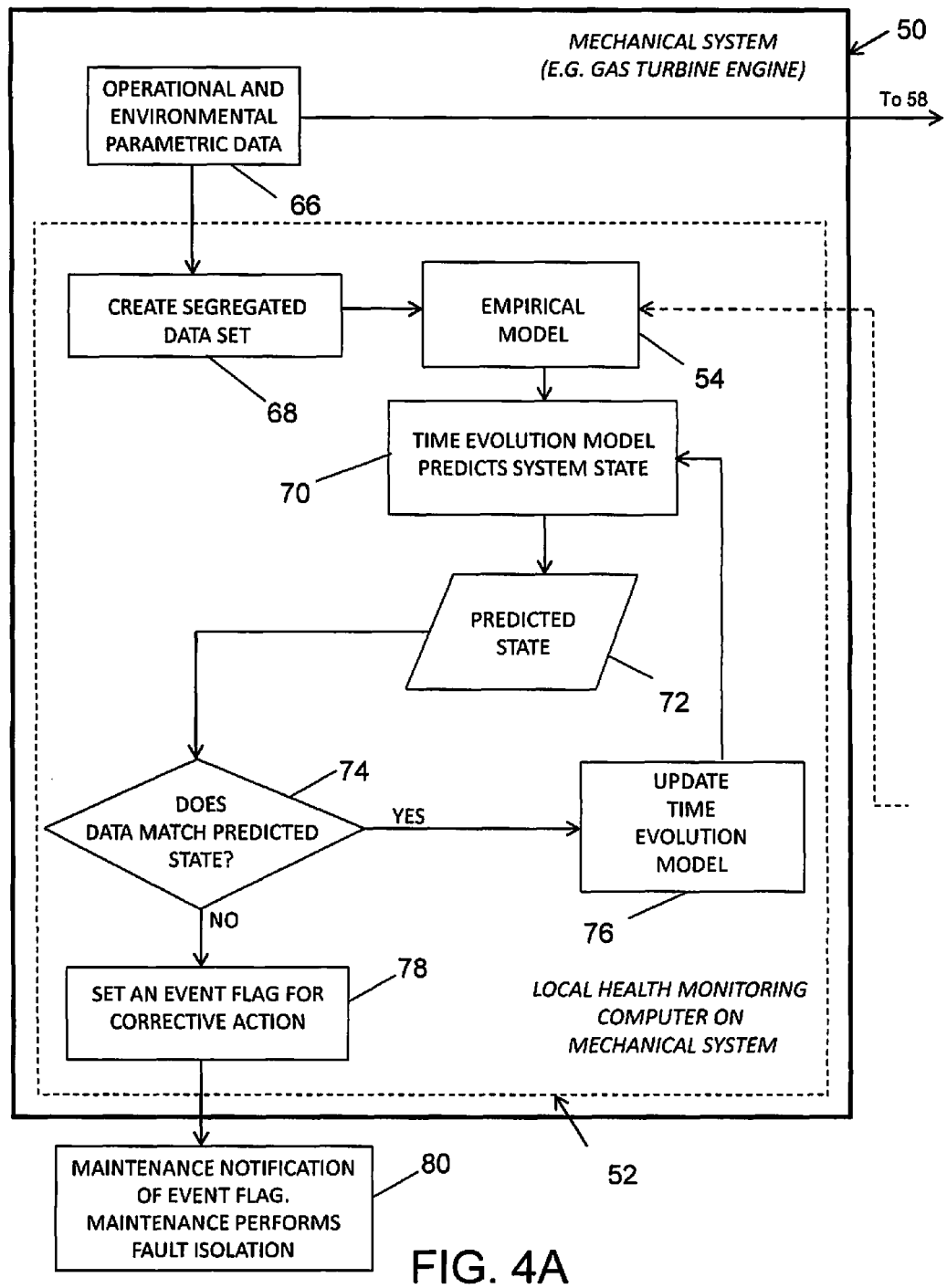
FIGS. 4A and 4B are block flow diagrams which, when viewed in conjunction, show a system in accordance with one embodiment of the invention.
Figure 4B:
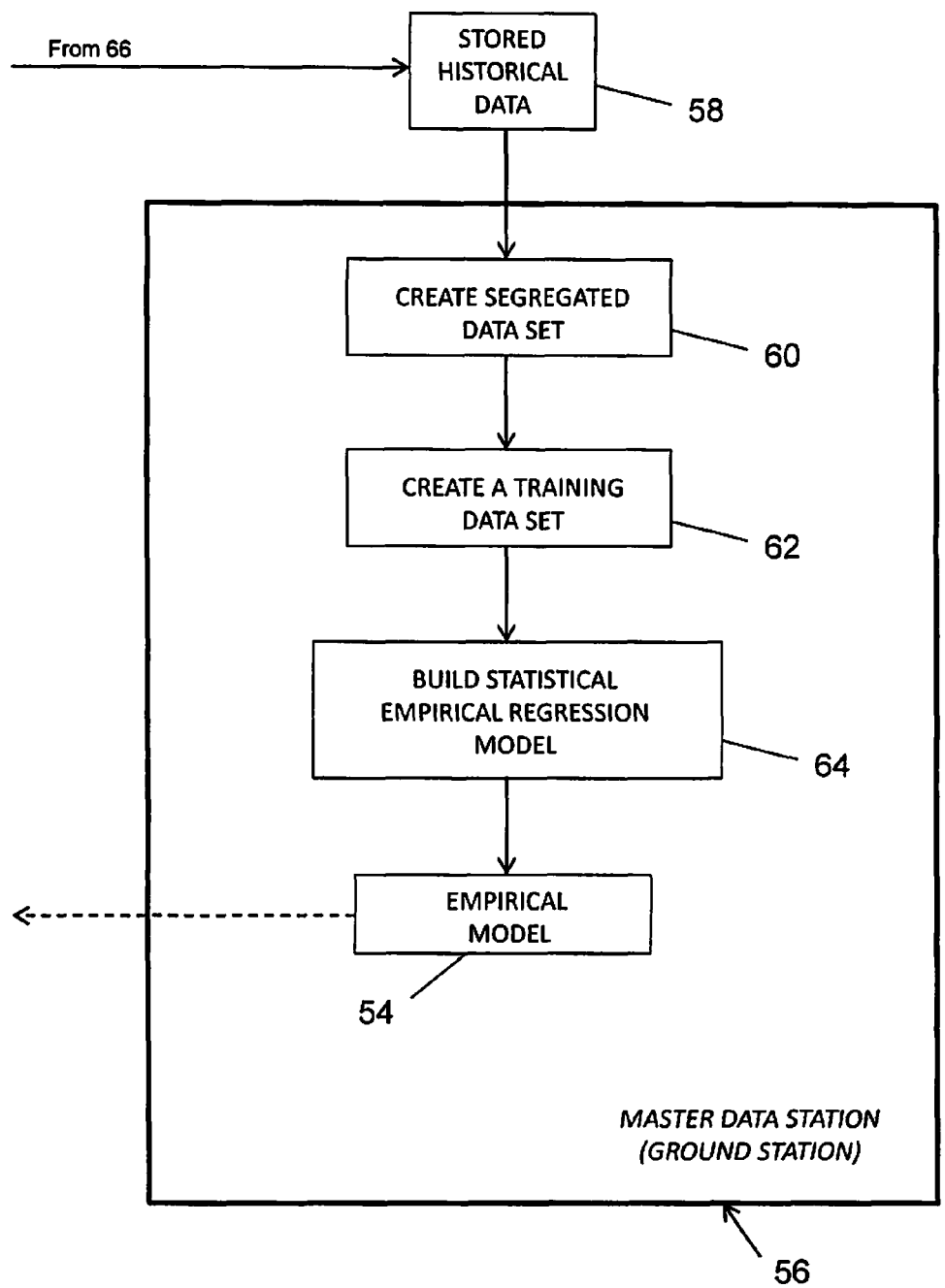

FIGS. 4A and 4B show a system in accordance with one embodiment of the invention. As shown in FIG. 4A, a mechanical system 50 (e.g., a gas turbine engine) installed on a vehicle (e.g., an airplane) is monitored (in the manner described above) by a local health monitoring computer 52 installed on the mechanical system. The health monitoring computer 52 stores an empirical model 54 provided by a computer installed at a master data station 56 (e.g., a ground station), shown in FIG. 4B. The empirical model 54 can be either transmitted directly or by an antenna (not shown in FIG. 4B) at the master data station 56 to an antenna (not shown in FIG. 4A) onboard the airplane or any other suitable wireless link (indicated by dashed lines in FIGS. 4A and 4B).

Referring to FIG. 4B, block 58 represents a historical database of operational and environmental parameters (non-segregated) for the mechanical system (item 50 in FIG. 4A). The computer at the master data station 56 preprocesses the historical data in the manner previously described to create an initial segregated data set (step 60 in FIG. 4B) per data set segregation criteria for a time period. The computer at the master data station 56 then creates a training data set (step 62) based on the segregated initial historical data only, as previously described. That same computer then builds a statistical empirical regression model (step 64), which in the case of a gas turbine aircraft engine, models the relationship between EGT and outside variables. The resulting empirical model 54 is then transmitted to the health monitoring computer 52.

Referring to FIG. 4A, after the empirical model 54 has been loaded, the health monitoring computer 52 is ready to monitor the operation of mechanical system 50. During operation of the mechanical system 50, various sensors (not shown) acquire current operational and environmental parametric data 66, which data is sent to the health monitoring computer 52. The health monitoring computer 52 is programmed with software for preprocessing the current data to create a segregated data set per data set segregation criteria for a time period (step 68). The health monitoring computer then calculates residuals using the empirical model 54. The health monitoring computer then uses a time evolution model to predict the operational states of the mechanical system (step 70). The resulting predicted state 72 is compared with the processed data and cumulative evidence in step 74. If the segregated data matches the predicted state, then the time evolution model 70 is updated (step 76). As previously explained with reference to FIG. 3, if the processed data and cumulative evidence do not agree with the predicted state 76, the time evolution is adapted for extreme change (i.e., uncertainty of the model is increased) (not shown in FIG. 4A) and an event flag for corrective action is set (step 78 in FIG. 4A), which event flag setting is stored in computer memory. This flag can be sent via radio immediately to inform maintenance or later when the airplane has landed, a maintenance computer (not shown) can be connected to the health monitoring computer 52 and used to check the status of this event flag. In response to receipt of a maintenance notification that the event flag has been set to a state indicating that corrective action is required, maintenance personnel will attempt to isolate the fault in the mechanical system which caused the disparity between the processed data and the predicted state (step 80 in FIG. 4A).

While the invention has been described with reference to various embodiments, it will be understood by those skilled in the art that various changes may be made and equivalents may be substituted for elements thereof without departing from the scope of the invention. In addition, many modifications may be made to adapt a particular situation to the teachings of the invention without departing from the essential scope thereof. Therefore it is intended that the invention not be limited to the particular embodiment disclosed as the best mode contemplated for carrying out this invention.

As used in the claims, the term "computer system" should be construed broadly to encompass a system which has at least one computer or processor, and may have two or more computers or processors. Also, the steps recited in the method claims should not be construed to require that such steps be performed in alphabetical order or in the order in which they are recited.

The invention claimed is:

1. A method for monitoring wear in a mechanical system, comprising:
    (a) repeatedly measuring a parameter over time during operation of the mechanical system;
    (b) calculating residuals at time points over the life of the mechanical system using an empirical model that models values of said parameter as a function of values of other parameters, said residuals representing the respective differences between each measurement of said parameter and each corresponding parameter value predicted by the empirical model;
    (c) determining whether the measurements evolve as expected under a time evolution model that relates predictions of residuals over time; and
    (d) flagging an event in response to the measurements of said parameter deviating over time from the behavior predicted by the time evolution model by more than a threshold value,
    wherein in accordance with said time evolution model, wear at time t equals the wear at a previous time (t−1) plus a local growth rate at time (t−1).

2. The method as recited in claim 1, further comprising isolating and rejecting outliers and adapting the time evolution model to reflect the onset of a structural change in response to the measurements deviating over time from the behavior predicted by the time evolution model by more than said threshold value.

3. The method as recited in claim 1, wherein said adapting comprises increasing the uncertainty in a prior distribution as measured by a prior covariance matrix.

4. The method as recited in claim 1, further comprising updating the time evolution model in response to the measurements deviating over time from the behavior predicted by the time evolution model by less than said threshold value.

5. The method as recited in claim 4, wherein the local growth rate is a random walk.

6. The method as recited in claim 1, wherein said time evolution model is a second-order polynomial dynamic linear model.

7. The method as recited in claim 1, wherein step (c) comprises comparing the respective predictive abilities of standard and alternative time evolution models, wherein said alternative model is similar in form to said standard model, but allows for more extreme wear observations.

8. The method as recited in claim 1, further comprising isolating a fault in said mechanical system when said event is flagged.

9. The method as recited in claim 1, wherein said mechanical system is a gas turbine engine and said parameter is engine exhaust gas temperature.

10. A method for monitoring wear in a mechanical system, comprising:
    (a) repeatedly measuring a parameter over time during operation of the mechanical system;
    (b) calculating the value of a monitoring statistic for each of said measurements;
    (c) calculating the value of a cumulative monitoring statistic that is a product of sequential values of said monitoring statistic;
    (d) determining whether the value of said monitoring statistic is less than or not less than a threshold value;
    (e) determining whether the value of said cumulative monitoring statistic is less than or not less than said threshold value; and
    (f) flagging an event in response to the values of said monitoring statistic and said cumulative monitoring statistic being less than said threshold value,
    wherein said mechanical system is a gas turbine engine and said parameter is engine exhaust gas temperature.

11. The method as recited in claim 10, wherein said event is an abrupt structural change in said mechanical system.

12. The method as recited in claim 10, further comprising isolating and rejecting outliers included in said measurements and increasing the uncertainty in a prior distribution as measured by a prior covariance matrix to reflect the onset of a structural change in response to the values of said monitoring statistic and said cumulative monitoring statistic being less than said threshold value.

13. The method as recited in claim 10, further comprising updating a time evolution model in response to the values of said monitoring statistic and said cumulative monitoring statistic being not less than said threshold value.

14. The method as recited in claim 10, further comprising isolating a fault in said mechanical system when said event is flagged.

15. A system for monitoring the health of a mechanical system, comprising a computer system programmed to perform the following operations:
    (a) receiving values representing the results of measurements of a parameter over time during operation of the mechanical system;
    (b) predicting residuals at time points over the life of the mechanical system using an empirical model that models values of said parameter as a function of values of other parameters, said residuals representing the respective differences between each measurement of said parameter and each corresponding parameter value predicted by the empirical model;
    (c) determining whether the measurements evolve as expected under a time evolution model that relates predictions of residuals over time; and
    (d) flagging an event in response to the measurements of said parameter deviating over time from the behavior predicted by the time evolution model by more than a threshold value,
    wherein said mechanical system is a gas turbine engine and said parameter is engine exhaust gas temperature.

16. The system as recited in claim 15, wherein said computer system is further programmed to perform the following operations:
    isolating and rejecting outliers and adapting the time evolution model to reflect the onset of a structural change in response to the measurements deviating over time from the behavior predicted by the time evolution model by more than said threshold value.

17. The system as recited in claim 16, wherein said adapting comprises increasing the uncertainty in a prior distribution as measured by a prior covariance matrix.

18. The system as recited in claim 15, wherein said computer system is further programmed to update the time evolution model in response to the measurements deviating over time from the behavior predicted by the time evolution model by less than said threshold value.

19. The system as recited in claim 15, wherein step (c) comprises comparing the respective predictive abilities of standard and alternative time evolution models, wherein said alternative model is similar in form to said standard model, but allows for more extreme changes in the mechanical system or component.

20. A system for monitoring the health of a mechanical system, comprising a computer system programmed to perform the following operations:
    (a) receiving values representing the results of measurements of a parameter over time during operation of the mechanical system;
    (b) calculating the value of a monitoring statistic for each of said measurements;
    (c) calculating the value of a cumulative monitoring statistic that is a product of a plurality of values of said monitoring statistic;
    (d) determining whether the value of said monitoring statistic is less than or not less than a threshold value;
    (e) determining whether the value of said cumulative monitoring statistic is less than or not less than said threshold value; and
    (f) flagging an event in response to the values of said monitoring statistic and said cumulative monitoring statistic being less than said threshold value,
    wherein said mechanical system is a gas turbine engine and said parameter is engine exhaust gas temperature.

* * * * *